(12) United States Patent
Pan et al.

(10) Patent No.: US 10,718,707 B2
(45) Date of Patent: Jul. 21, 2020

(54) LIQUID CRYSTAL PHOTOELECTRIC APPARATUS AND OPTICAL IMAGING PROCESSING SYSTEM

(71) Applicants: National Tsing Hua University, Hsinchu (TW); Advanced Comm. Engineering Solution Co., Ltd., Hsinchu County (TW)

(72) Inventors: Ci-Ling Pan, Hsinchu (TW); Anup Kumar Sahoo, Hsinchu (TW); Chan-Shan Yang, Taipei (TW); Chun-Ling Yen, Hsinchu (TW); Yuan-Chun Lu, Yunlin County (TW)

(73) Assignees: National Tsing Hua University, Hsinchu (TW); Advanced Comm. Engineering Solution Co., Ltd., Hsinchu County (TW)

( * ) Notice: Subject to any disclaimer, the term of this patent is extended or adjusted under 35 U.S.C. 154(b) by 0 days.

(21) Appl. No.: 16/166,175

(22) Filed: Oct. 22, 2018

(65) Prior Publication Data

US 2020/0064256 A1 Feb. 27, 2020

(30) Foreign Application Priority Data

Aug. 22, 2018 (TW) .............................. 107129316 A

(51) Int. Cl.
*G02F 1/13* (2006.01)
*G01N 21/35* (2014.01)
(Continued)

(52) U.S. Cl.
CPC ........... *G01N 21/35* (2013.01); *G01N 21/255* (2013.01); *G02F 1/1337* (2013.01);
(Continued)

(58) Field of Classification Search
None
See application file for complete search history.

(56) References Cited

U.S. PATENT DOCUMENTS

2013/0050601 A1\* 2/2013 Takeda .............. G02F 1/134363
349/41
2018/0026581 A1 1/2018 Dutta et al.

FOREIGN PATENT DOCUMENTS

CN 1963598 5/2007
CN 108287418 7/2018
(Continued)

OTHER PUBLICATIONS

Sahoo; Anup Kumar et al. "Spatial Light Modulator for Single-Pixel Terahertz Imaging Systems based on Compressive Sensing Method," Optics and Photonics Taiwan, International Conference, Dec. 7-9, 2017, pp. 1.

(Continued)

*Primary Examiner* — Richard H Kim
(74) *Attorney, Agent, or Firm* — JCIPRNET

(57) ABSTRACT

A liquid crystal photoelectric apparatus includes a first and a second quartz glass substrates, an upper alignment layer disposed between the first and the second quartz glass substrates, a lower alignment layer disposed between the upper alignment layer and the second quartz glass substrate, a liquid crystal material disposed between the upper and the lower alignment layers, a first transparent conductive layer disposed between the upper alignment layer and the first quartz glass substrate and including at least one first main portion and first finger portions extending from the corresponding first main portion and a second transparent conductive layer second transparent conductive layer disposed between the lower alignment layer and the second quartz glass substrate and including a second main portion and second finger portions extending from the second main portion in an extension direction perpendicular to that of the first finger portions. An optical imaging processing system is provided.

10 Claims, 21 Drawing Sheets

(51) Int. Cl.
  *G02F 1/1337* (2006.01)
  *G02F 1/1343* (2006.01)
  *G01N 21/25* (2006.01)
  *H04N 5/225* (2006.01)
(52) U.S. Cl.
  CPC ....... *G02F 1/13439* (2013.01); *H04N 5/2256* (2013.01); *G01N 2201/0675* (2013.01); *G02F 2203/12* (2013.01); *G02F 2203/13* (2013.01)

(56) References Cited

FOREIGN PATENT DOCUMENTS

| TW | 201009418 | 3/2010 |
| TW | 201423204 | 6/2014 |
| TW | 201447245 | 12/2014 |
| TW | 201814237 | 4/2018 |

OTHER PUBLICATIONS

"Office Action of Taiwan Counterpart Application," dated Apr. 16, 2019, p. 1-p. 4.

\* cited by examiner

LIQUID CRYSTAL PHOTOELECTRIC APPARATUS AND OPTICAL IMAGING PROCESSING SYSTEM

CROSS-REFERENCE TO RELATED APPLICATION

This application claims the priority benefit of Taiwan application serial no. 107129316, filed on Aug. 22, 2018. The entirety of the above-mentioned patent application is hereby incorporated by reference herein and made a part of this specification.

BACKGROUND

Technical Field

The invention relates to a liquid crystal photoelectric apparatus and an optical imaging processing system applying the liquid crystal photoelectric apparatus. More particularly, the invention relates to a liquid crystal photoelectric apparatus for terahertz waves and an optical imaging processing system applying the liquid crystal photoelectric apparatus.

Description of Related Art

In recent years, more and more terahertz-related researches have been conducted in related technical fields. The terahertz waves have been applied more and more widely due to its special optical characteristics, and various optoelectronics apparatuses applicable to terahertz waves are increasingly demanded, for example, the applications in terahertz optoelectronics devices such as imaging systems, modulators or phase retarders. Especially, applications and researches related to a spatial light modulator of a terahertz imaging system are an important development direction at present.

In the existing terahertz imaging system, when a terahertz light beam is projected on the spatial light modulator disposed therein, a plurality of array units of the spatial light modulator may adjust each parameter of the terahertz light beam projected thereon according to an electrical signal. An optical receiver and a processor at a back end are used to receive and analyze image data.

However, in a conventional spatial light modulator for the terahertz imaging system, its architecture mainly includes a plurality of split-ring resonator (SRR) arrays which are made of a metamaterial and disposed on a gallium arsenide (GaAs) substrate. As the GaAs substrate is relatively expensive, and structures of both the SRR and the GaAs substrate are complicated, the manufacturing cost is quite high, and the manufacturing steps are complicated, which results in difficulty in increasing the number of the SRR arrays and the failure in effectively improving image resolution. In the meantime, in the presence of the SRRs, the above-mentioned spatial light modulator operates at a fixed frequency and cannot be applied to wider terahertz spectrums.

SUMMARY

The invention provides a liquid crystal photoelectric apparatus having a simple architecture, low manufacturing cost and a wide terahertz frequency application range.

The invention provides an optical imaging processing system having low manufacturing cost, a wide terahertz frequency application range and a preferable image resolution.

According to an embodiment of the invention, a liquid crystal photoelectric apparatus including a first quartz glass substrate, a second quartz glass substrate, an upper alignment layer, a lower alignment layer, a liquid crystal material, a first transparent conductive layer and a second transparent conductive layer is provided. The upper alignment layer is disposed on the first quartz glass substrate. The lower alignment layer is disposed on the second quartz glass substrate. The liquid crystal material is filled in between the upper alignment layer and the lower alignment layer. The first transparent conductive layer is disposed between the upper alignment layer and the first quartz glass substrate and includes at least one first main portion and a plurality of first finger portions extending from the corresponding first main portion. The second transparent conductive layer is disposed between the lower alignment layer and the second quartz glass substrate and includes a second main portion and a plurality of second finger portions extending from the second main portion. An extension direction of the first finger portions is perpendicular to an extension direction of the second finger portions.

According to an embodiment of the invention, an optical imaging processing system including a terahertz light emitter, the above-described liquid crystal photoelectric apparatus, an optical receiver and an image processor is provided. The terahertz light emitter is used to emit a detection beam having a frequency in a terahertz band. The detection beam passes through an object to be tested to obtain a transmission beam. The transmission beam carries image information of the object to be tested. The liquid crystal photoelectric apparatus is disposed on a transmission path of the transmission beam. The optical receiver is disposed on the transmission path of the transmission beam, and the liquid crystal photoelectric apparatus is disposed between the object to be tested and the optical receiver. The image processor is coupled to the optical receiver and analyzes the image information of the object to be tested according to the transmission beam.

To sum up, in the liquid crystal photoelectric apparatus provided by the embodiments of the invention, since the substrates for supporting each element are inexpensive quartz glass substrates and can achieve the function of modulating an amplitude of the incident light with the design of the transparent conductive layers which are easily patterned and the extension directions of the finger portions, the manufacturing cost can be lower. In the meantime, the liquid crystal photoelectric apparatus provided by the embodiments of the invention can exhibit preferable phase difference modulation capability and amplitude modulation capability at different frequencies of an incident terahertz light beam, so as to have a wide application range of the frequencies of the terahertz light beam. In the optical imaging processing system provided by the embodiments of the invention, the liquid crystal photoelectric apparatus is used as a spatial light modulator, and since the liquid crystal photoelectric apparatus uses the transparent conductive layers which are capable of being easily patterned, the number of the pixel regions can be easily increased, such that the optical imaging processing system can have a preferable image resolution as well as the advantages of the liquid crystal photoelectric processing apparatus.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and a part of the specification. The drawings are embodiments of the invention and together with the description, serve to explain the principles of the invention.

DESCRIPTION OF THE EMBODIMENTS

Figure 1A:
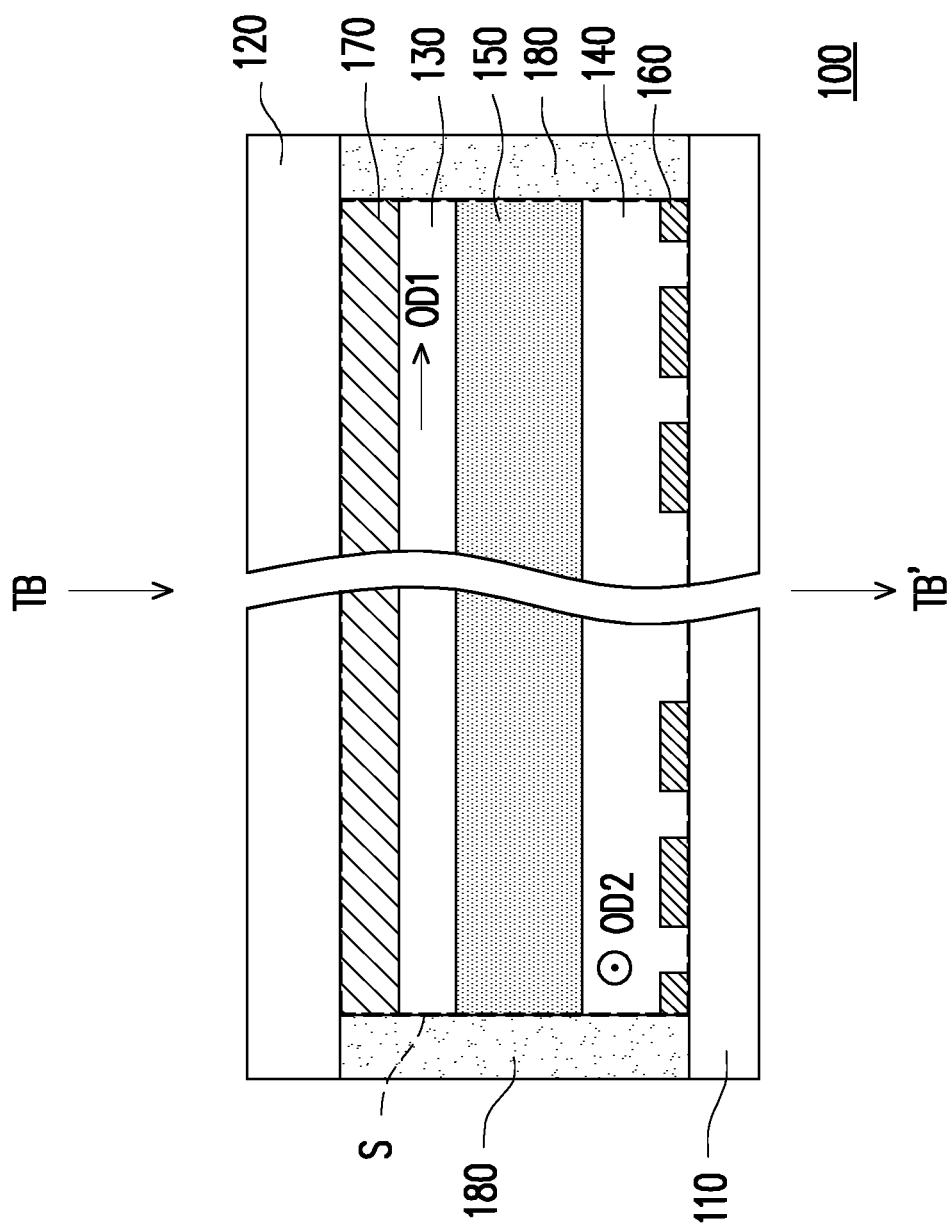
FIG. 1A is a schematic cross-sectional view showing a liquid crystal photoelectric apparatus according to an embodiment of the invention.
Figure 1B:
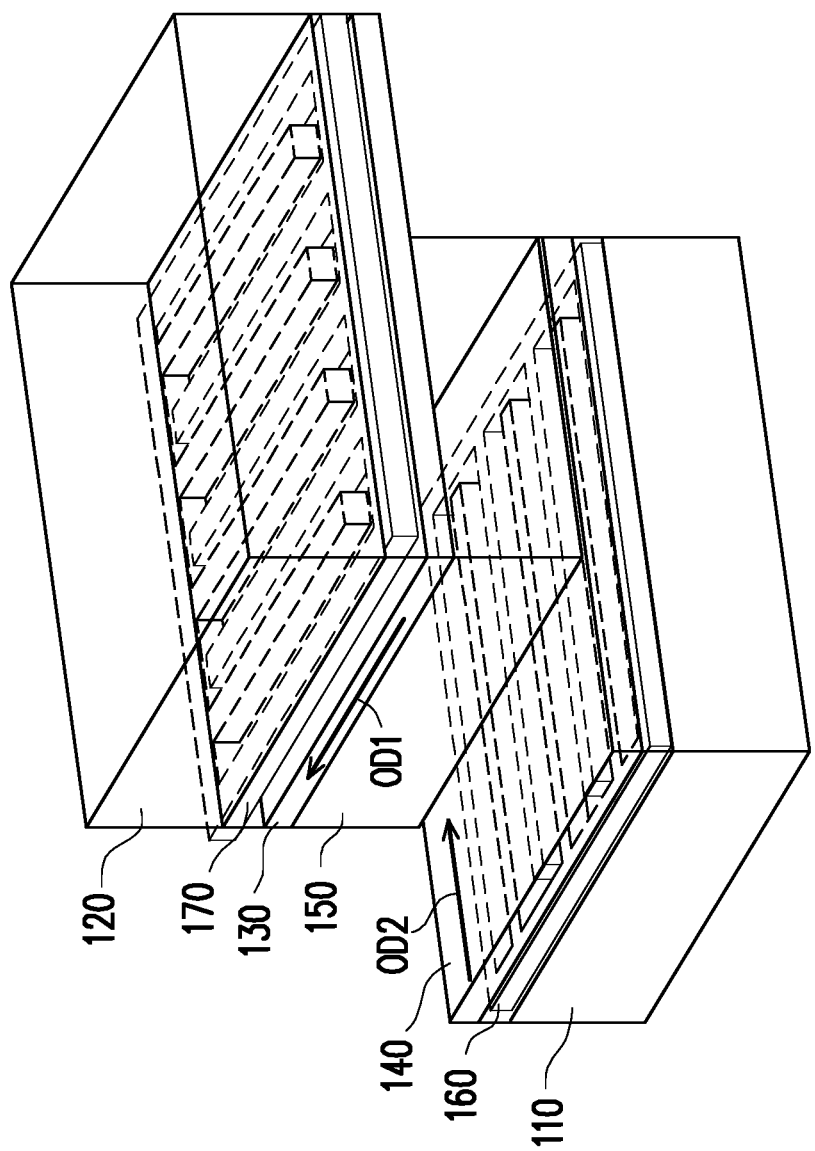
FIG. 1B is a schematic perspective view of the embodiment of FIG. 1A.

FIG. 1A is a schematic cross-sectional view showing a liquid crystal photoelectric apparatus according to an embodiment of the invention. FIG. 1B is a schematic perspective view of the embodiment of FIG. 1A. For clearness, a spacer, a part of an upper substrate, a part of a lower substrate and a part of a transparent conductive layer are omitted in FIG. 1B.

In the present embodiment, a liquid crystal photoelectric apparatus 100 includes quartz glass substrates 110 and 120, an upper alignment layer 130, a lower alignment layer 140, a liquid crystal material 150, transparent conductive layers 160 and 170 and a spacer 180. The liquid crystal photoelectric apparatus 100 is, for example, a liquid crystal based terahertz spatial light modulator and is adapted to modulate a specific parameter of a light field of a light beam which irradiates thereon and has a wavelength range in a terahertz band. The parameter of the light field includes, for example, a phase, an amplitude and so on of the light field, but the invention is not limited thereto. The aforementioned elements will be described in detail below.

The quartz glass substrates 110 and 120 are used as supports for each element in the liquid crystal photoelectric apparatus 100 and may be, for example, substrates that allows terahertz waves to pass through. The thickness of both the quartz glass substrates 110 and 120 is, for example, 0.88 mm, which is not limited herein.

The upper alignment layer 130 and the lower alignment layer 140 mainly function to control arrangement or angles of liquid crystal molecules in the liquid crystal material 150. The upper alignment layer 130 and the lower alignment layer 140 are made of, for example, a polymer material (e.g., polyimide (PI)), which is not limited herein. In the present embodiment, an orientation direction OD1 of the upper alignment layer 130 and an orientation direction OD2 of the lower alignment layer 140 are perpendicular to each other.

The liquid crystal material 150 includes nematic liquid crystal (NLC).

The material of the transparent conductive layers 160 and 170 includes transparent conductive metal oxide or other suitable transparent conductive materials, but the invention is not limited thereto. In the present embodiment, the material of the transparent conductive layers 160 and 170 is, for example, indium tin oxide (ITO). The thickness of both the transparent conductive layers 160 and 170 is, for example, 100 nm, which is not limited herein. The liquid crystal photoelectric apparatus 100 may be coupled to an external power source (not shown) to form an electric field between the transparent conductive layers 160 and 170 to control the arrangement of the liquid crystal molecules of the liquid crystal material 150.

The spacer 180 is used to keep fixing a cell gap between the quartz glass substrates 110 and 120, thereby maintaining thickness uniformity for the liquid crystal material 150 disposed between the quartz glass substrates 110 and 120. In the present embodiment, a thickness of the spacer 180 is, for example, 600 μm, but the invention is not limited thereto.

A manufacturing method of the liquid crystal photoelectric apparatus 100 of the present embodiment will be described in detail below.

FIG. 2A through FIG. 2H are top schematic views of a manufacturing method of the liquid crystal photoelectric apparatus 100 of FIG. 1A. FIG. 3A to FIG. 3H are schematic cross-sectional views respectively corresponding to FIG. 2A to FIG. 2H showing the manufacturing method.

Figure 2A:
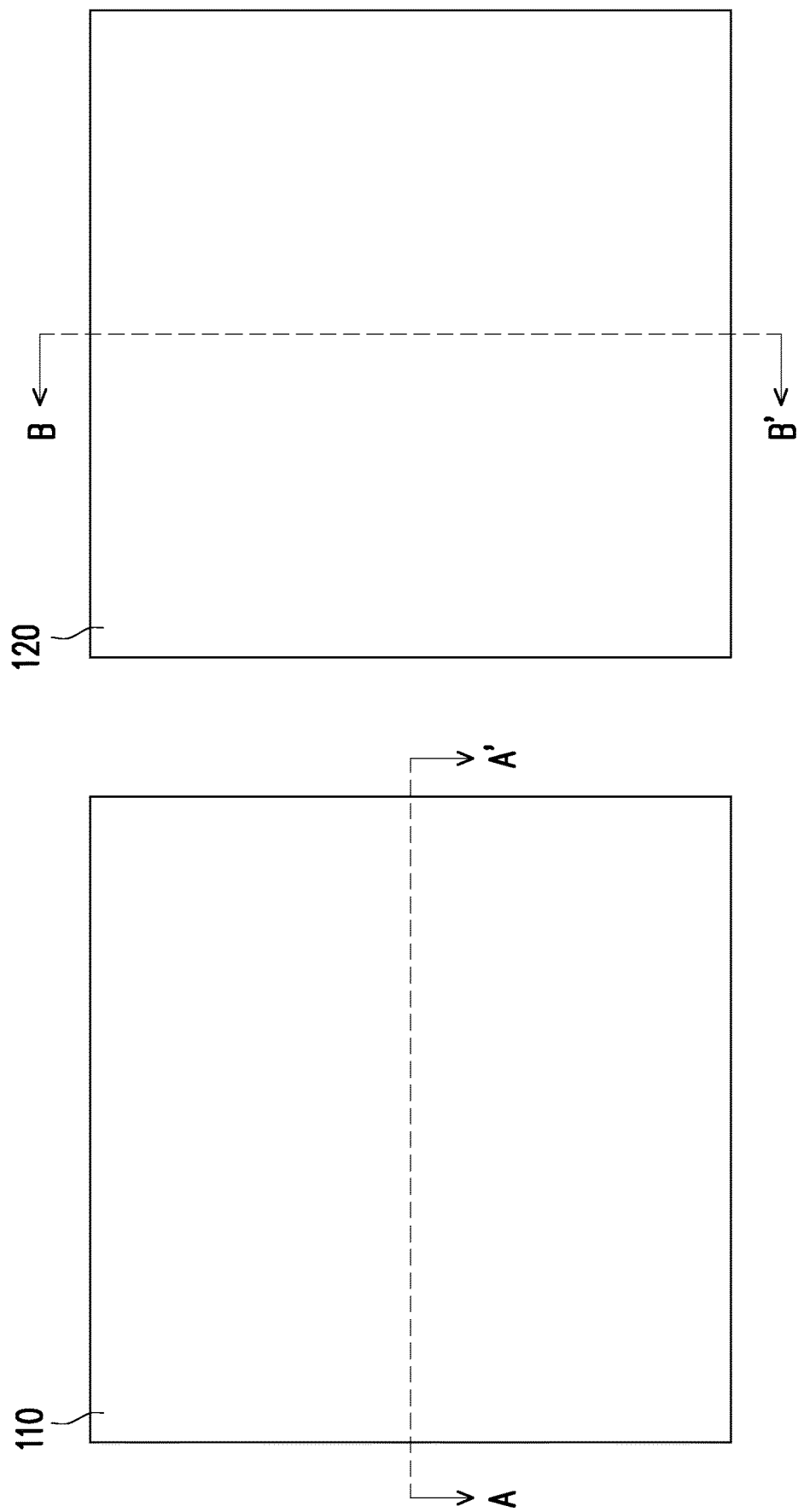
FIG. 2A through FIG. 2H are top schematic views of a manufacturing method of the liquid crystal photoelectric apparatus of FIG. 1A.
Figure 3A:
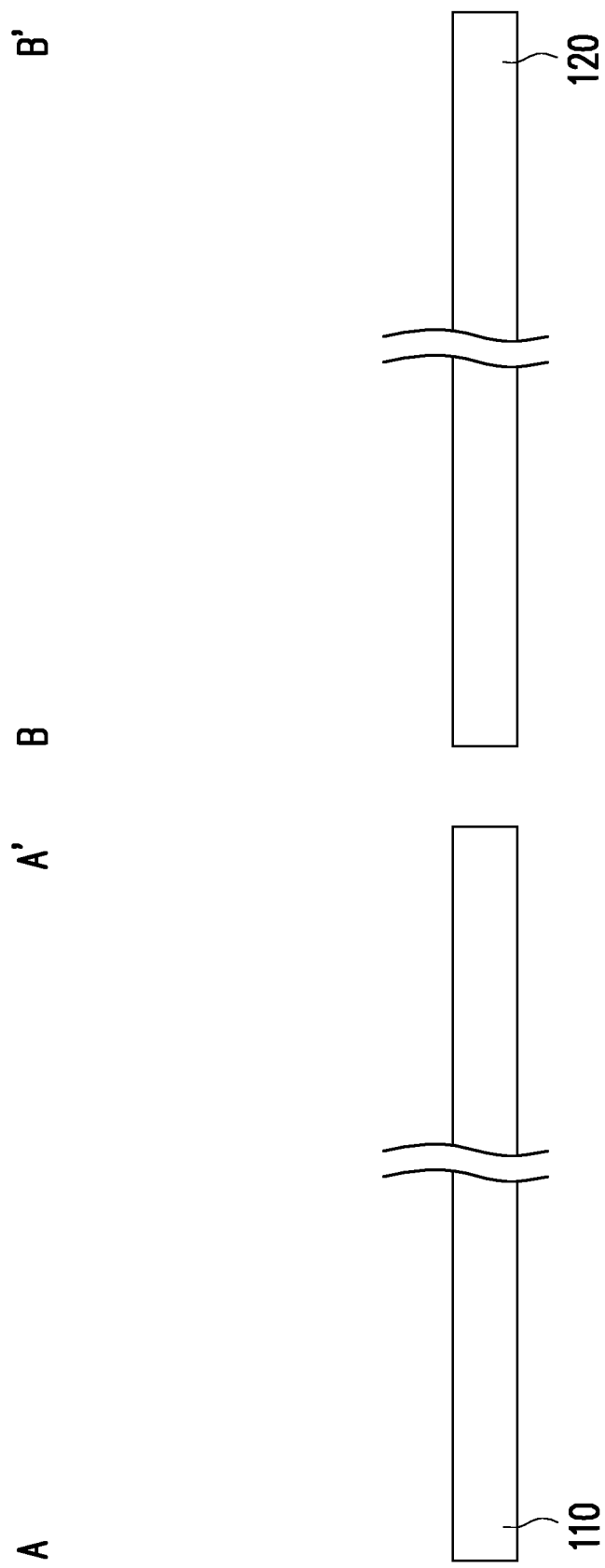
FIG. 3A to FIG. 3H are schematic cross-sectional views respectively corresponding to FIG. 2A to FIG. 2H showing the manufacturing method.

Referring to FIG. 2A and FIG. 3A, the quartz glass substrates 110 and 120 are provided, and a cleaning step and a drying step are performed thereon to remove metal ions, organic molecules, natural oxide layers or dust attached thereto, thereby completing the step of preparing the quartz glass substrates.

Then, the transparent conductive layers 160 and 170 are formed on surfaces of the quartz glass substrates 110 and 120. This forming step may be substantially divided into three steps as shown in FIG. 2B through FIG. 2D corresponding to FIG. 3B through FIG. 3D.

Figure 2B:
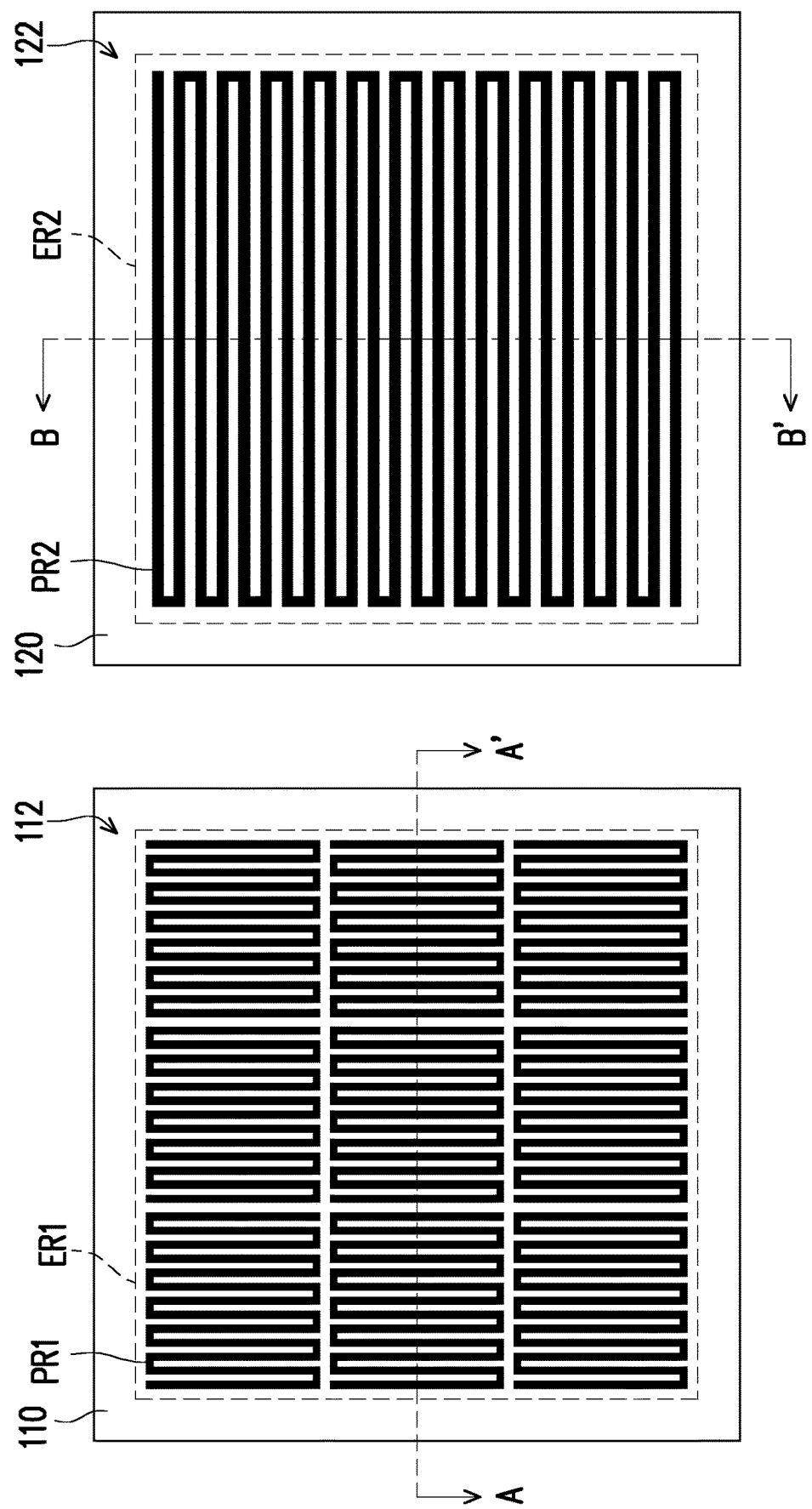
Figure 3B:
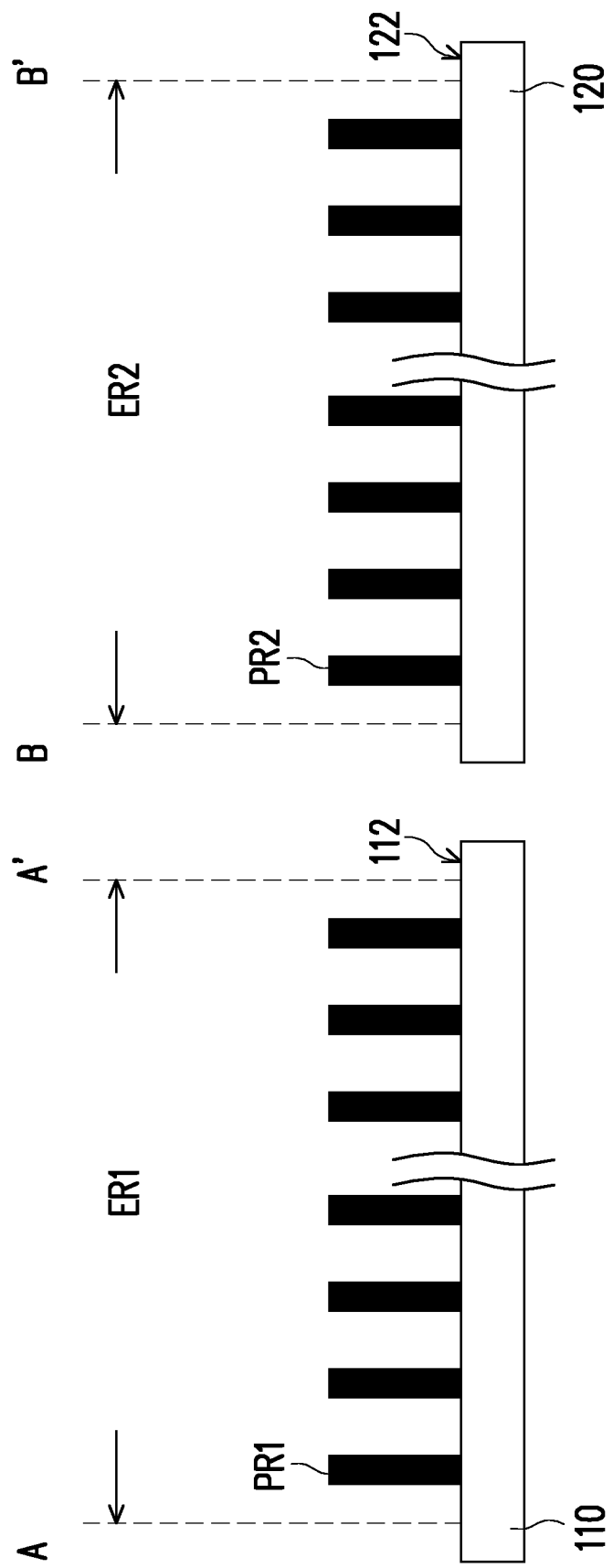

Referring to FIG. 2B and FIG. 3B, first, patterned photoresist layers PR1 and PR2 are formed by using masks respectively on electrode forming regions ER1 and ER2 of surfaces 112 and 122. A method of forming the patterned photoresist layers PR1 and PR2 is, for example, a photolithography process.

Figure 2C:
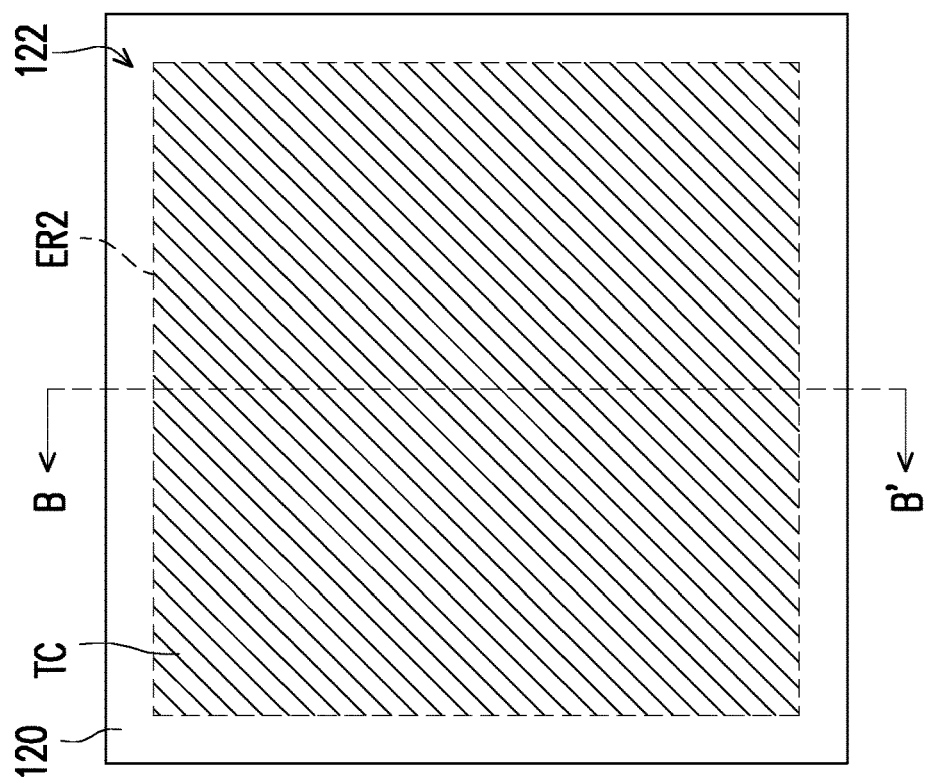
Figure 2C:
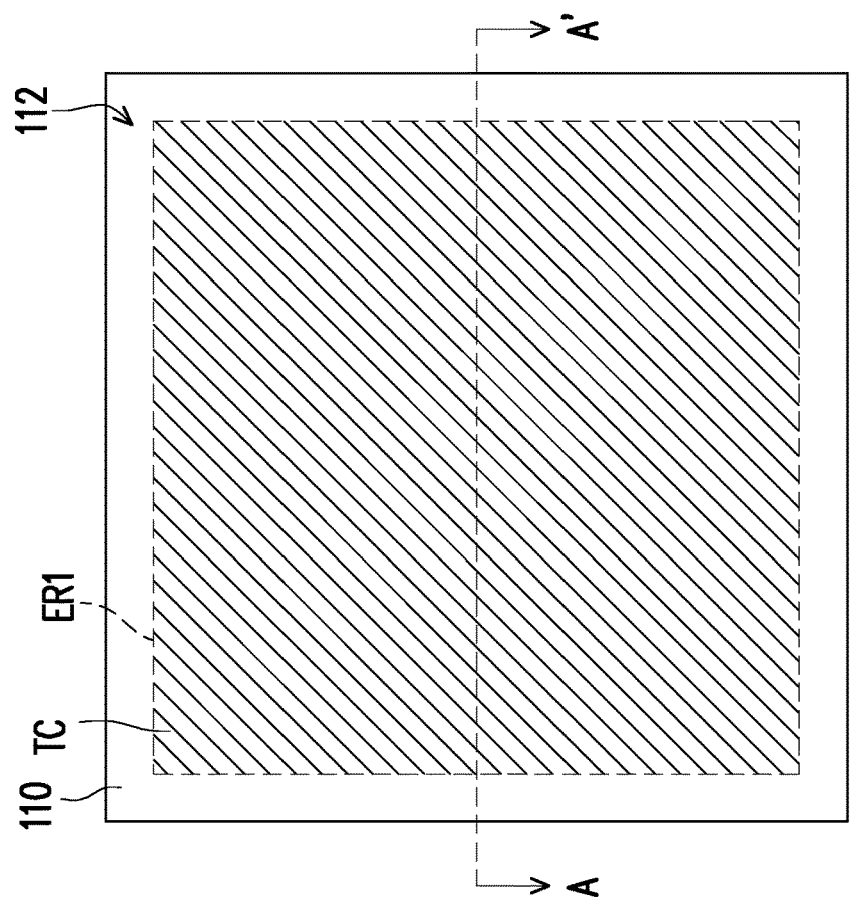
Figure 3C:
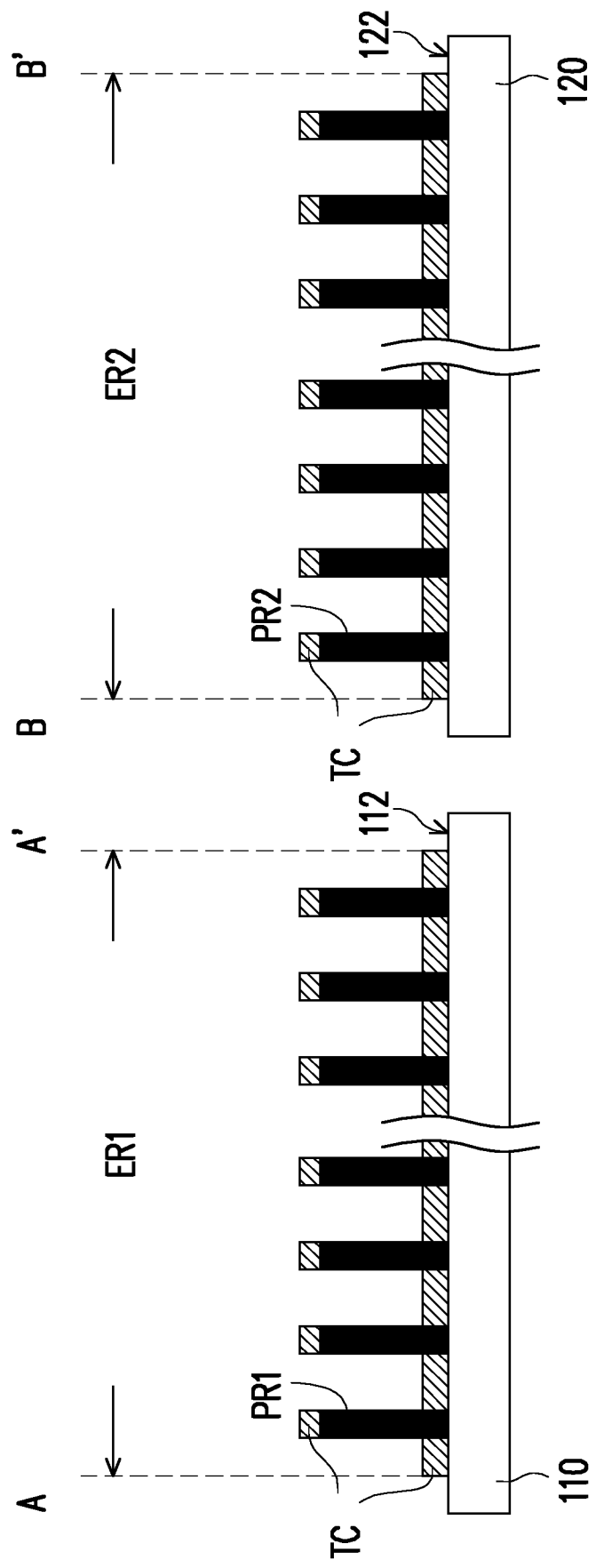

Referring to FIG. 2C and FIG. 3C, a transparent conductive material TC is deposited in the electrode forming regions ER1 and ER2. A method of the deposition may be sputtering, which is not limited herein. Therefore, the transparent conductive material TC is formed on the patterned photoresist layers PR1 and PR2 and in a gap between the patterned photoresist layers PR1 and PR2.

Figure 2D:
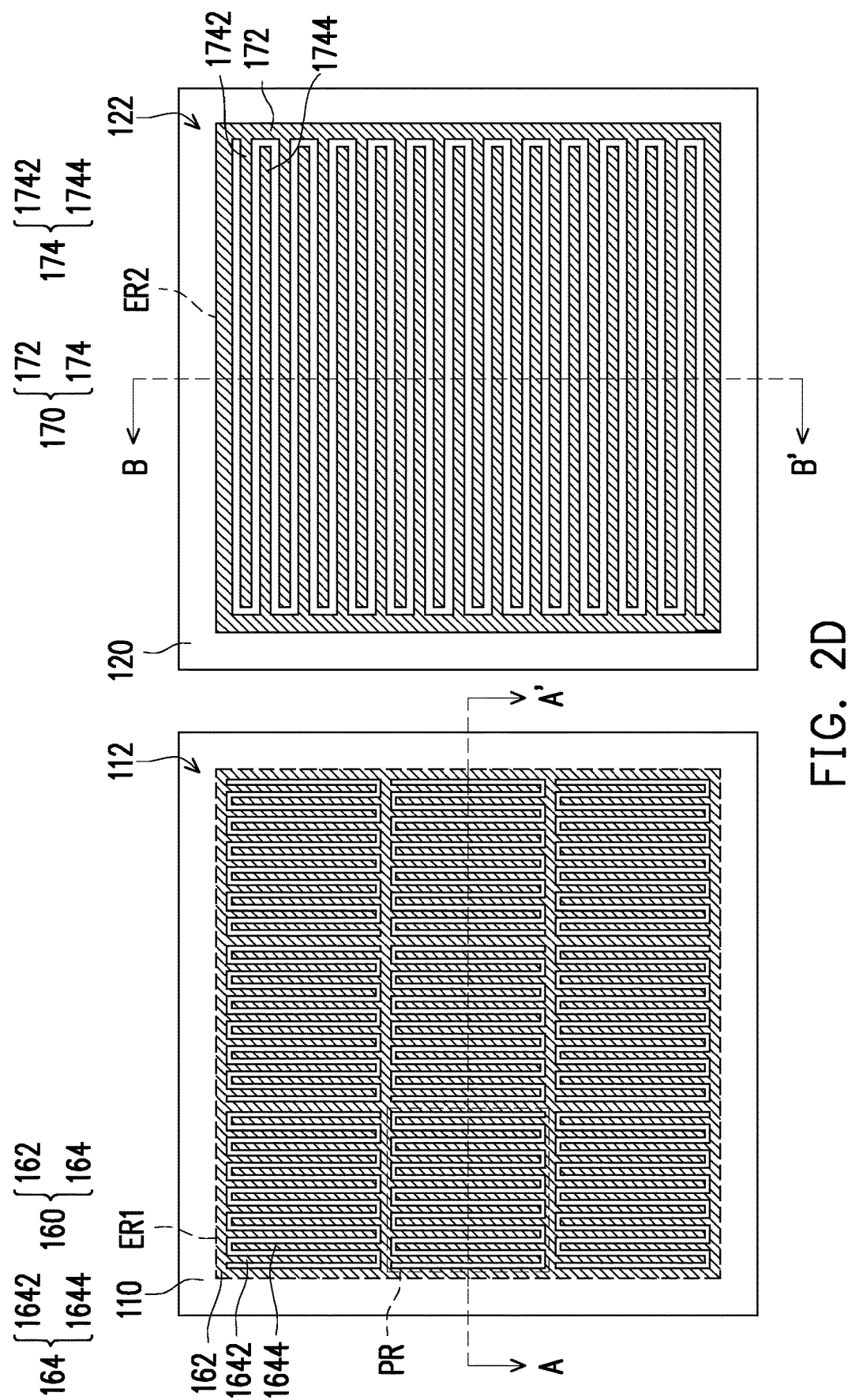
Figure 3D:
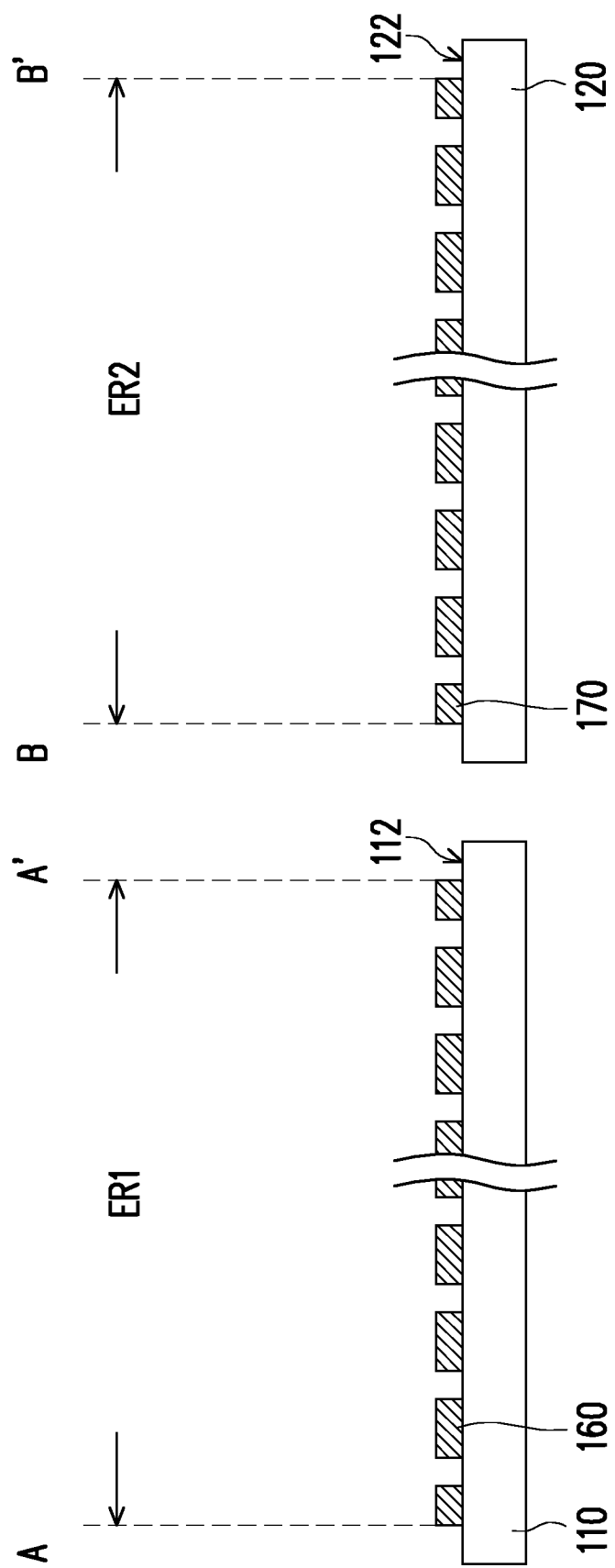

Referring to FIG. 2D and FIG. 3D, the patterned photoresist layers PR1 and PR2 are removed, and thus, the transparent conductive material TC thereon is removed, thereby leaving the transparent conductive material TC previously in the gap between the patterned photoresist layers PR1 and PR2. So far, the steps of forming the transparent conductive layers 160 and 170 are substantially completed.

The liquid crystal photoelectric apparatus 100 has a plurality of pixel regions PR arranged in an array (FIG. 2D shows nine pixel regions PR, and one of them is labeled as an example). In FIG. 2D, the transparent conductive layer 160 has a plurality of main portions 162 and a plurality of finger portions 164 extending from the main portions 162. In each pixel region PR, a main portion 162 and a plurality of finger portions 164 extending from the corresponding main portion 162 are disposed. A part of the transparent conductive layer 160 in a square shape in each pixel region PR is referred to as the main portion 162, and a grating transparent conductive layer 160 inside the square-shaped part is referred to as the finger portions 164. The finger portions 164 are divided into two portions 1642 and 1644, where a part of the portions, e.g., the finger portions 1642, protrude from the top, and the other part of the finger portions, e.g., the finger portions 1644, protrude from the bottom. The gap between the finger portions 1642 and 1644 is in a spiral form. Similarly, the transparent conductive layer 170 has a main portion 172 and a plurality of finger portions 174 extending from the main portion 172, which is different from the transparent conductive layer 160 in the transparent conductive layer 170 having one main portion 172. In addition, controllers (not shown) and corresponding traces (not shown) may be correspondingly disposed on the quartz glass substrates 110 and 120 to be electrically connected with the transparent conductive layers 160 and 170.

Figure 2E:
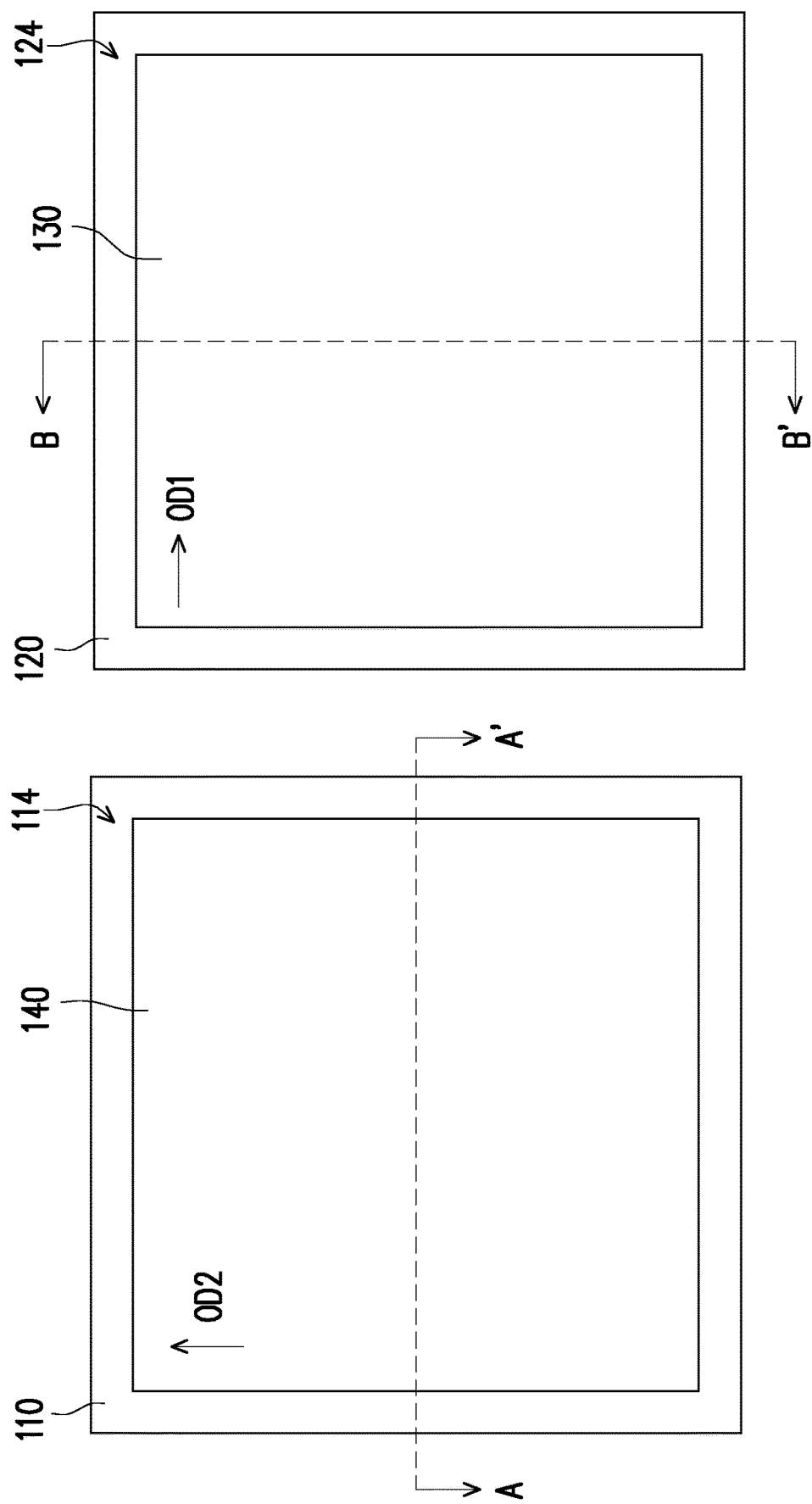
Figure 3E:
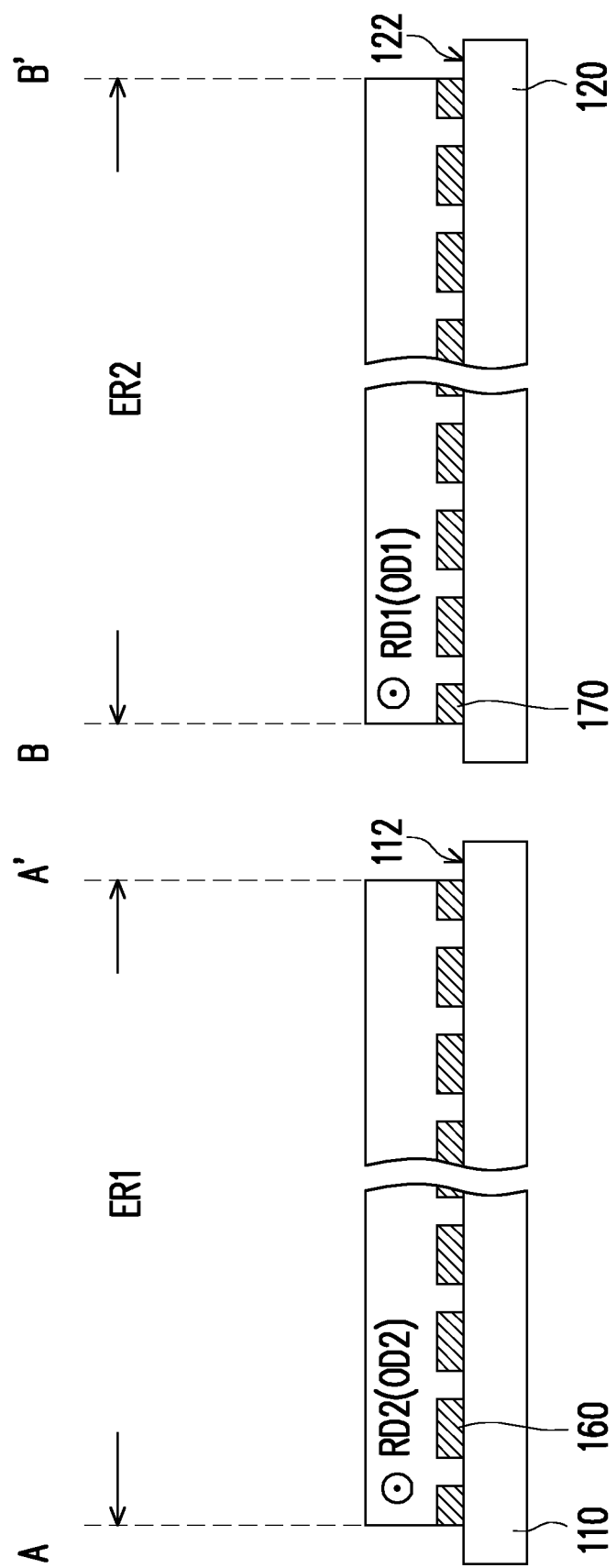

Referring to FIG. 2E and FIG. 3E, two polymer films are respectively formed on the transparent conductive layers 160 and 170. In detail, the liquid type polymer material (e.g., PI, but not limited thereto) is dropped in an appropriate amount on the transparent conductive layers 160 and 170, and polymer layers are then formed by a solution method (which may be a spin coating method or a dip coating method) and dried at an appropriate temperature, thereby forming the two polymer films on the transparent conductive layers 160 and 170. Next, surfaces of the two polymer films are rubbed with a roller flannel (not shown) in a rubbing direction RD1 and a rubbing direction RD2, and the two rubbing directions RD1 and RD2 are perpendicular to each other, such that the lower alignment layer 140 and the upper alignment layer 130 are formed respectively on the transparent conductive layers 160 and 170. The orientation direction OD1 of the upper alignment layer 130 and the orientation direction OD2 of the lower alignment layer 140 are defined respectively by the rubbing directions RD1 and RD2.

Figure 2F:
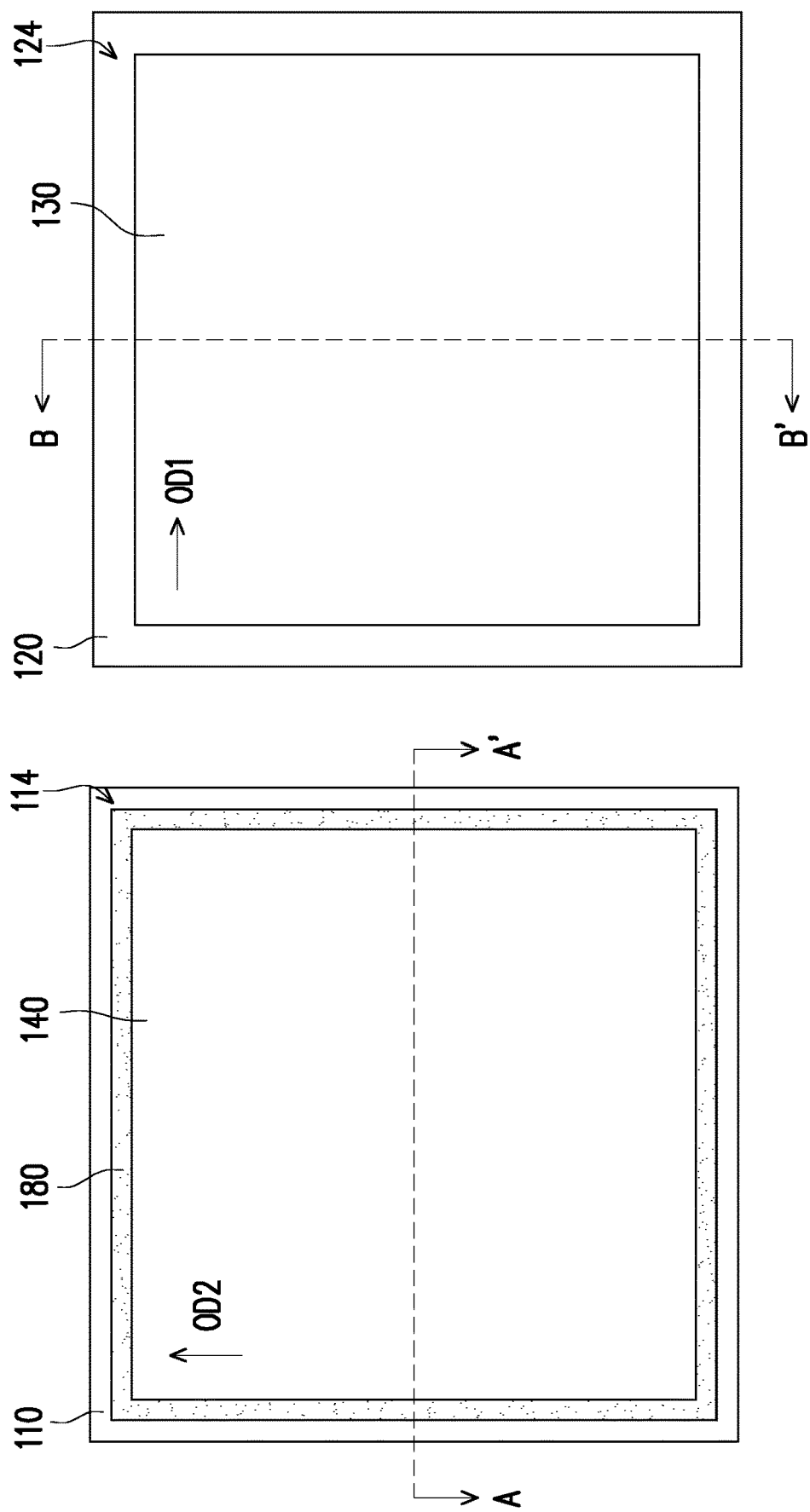
Figure 3F:
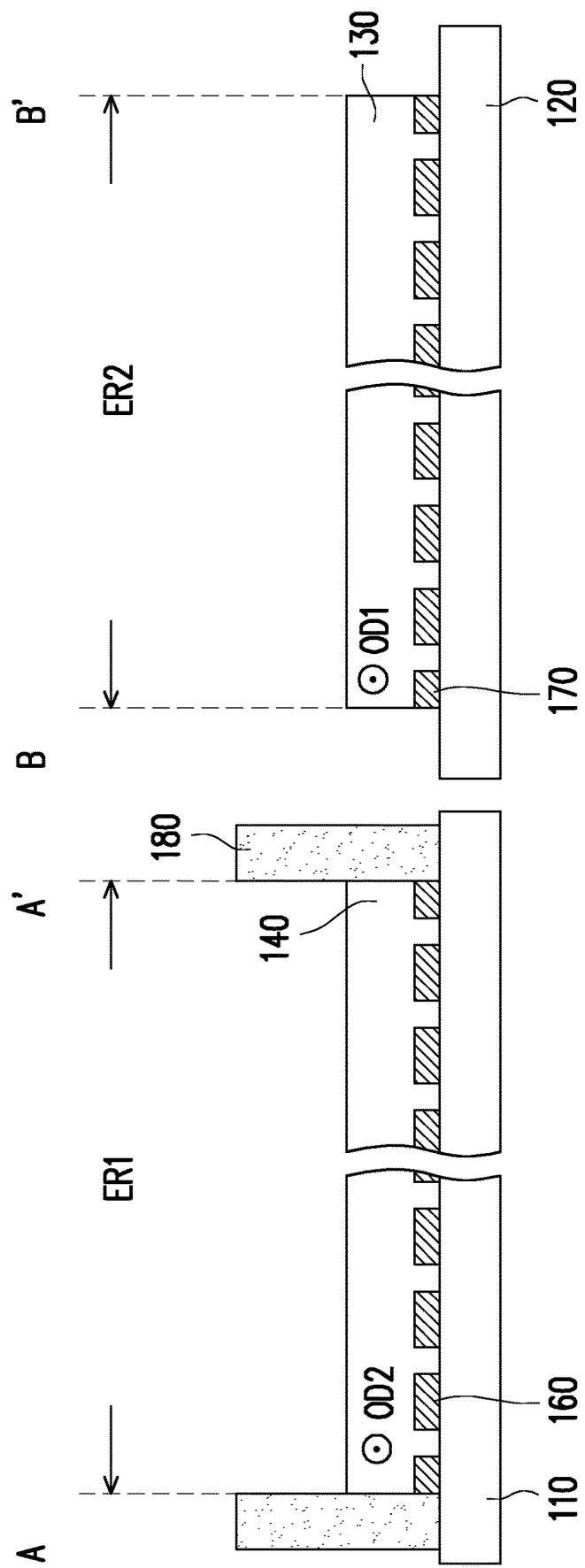

Referring to FIG. 2F and FIG. 3F, the spacer 180 is disposed on the quartz glass substrate 110 provided with the lower alignment layer 140 and the transparent conductive layer 170, and the spacer 180 surrounds the lower alignment layer 140.

Figure 2G:
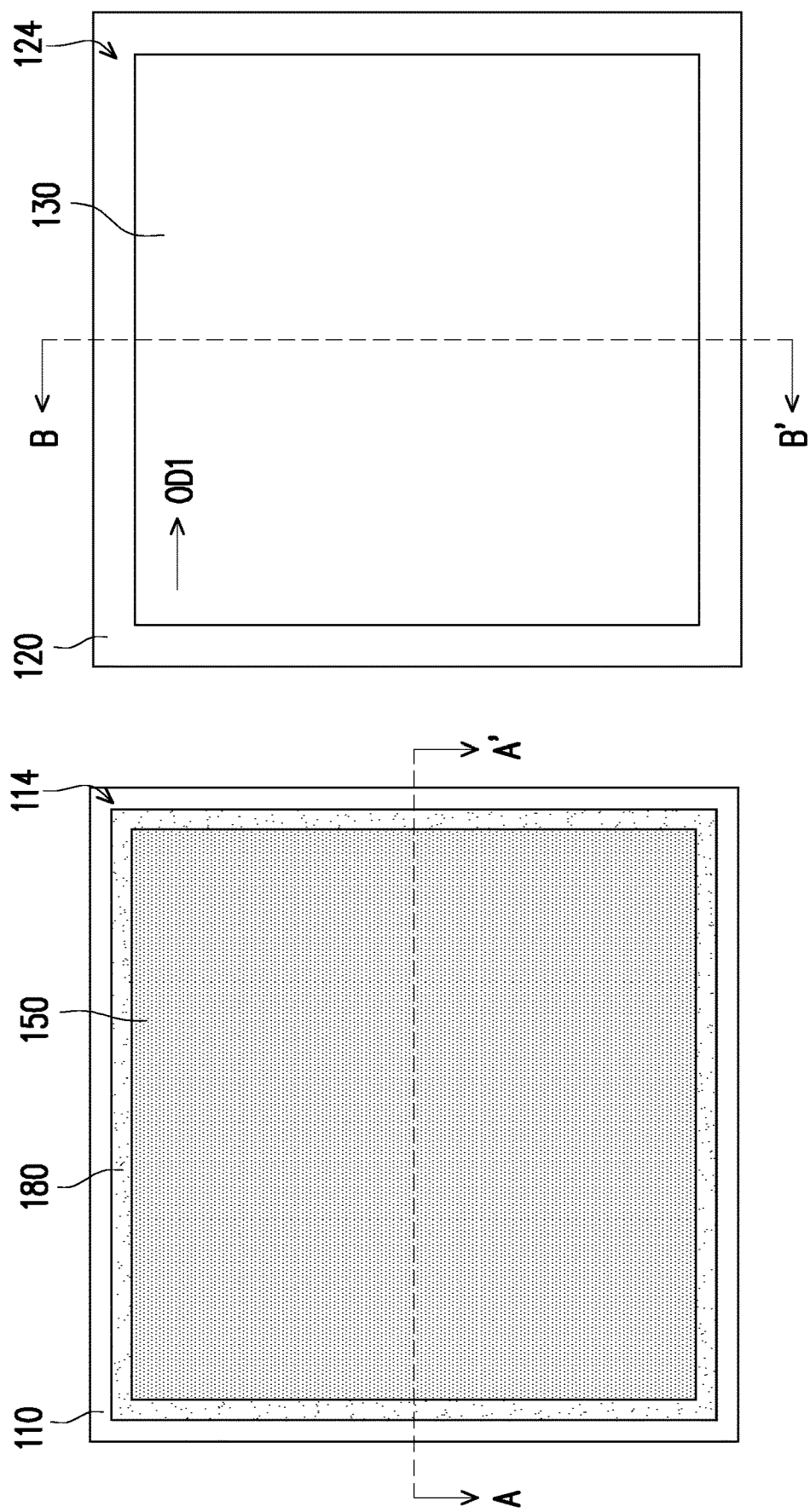
Figure 3G:
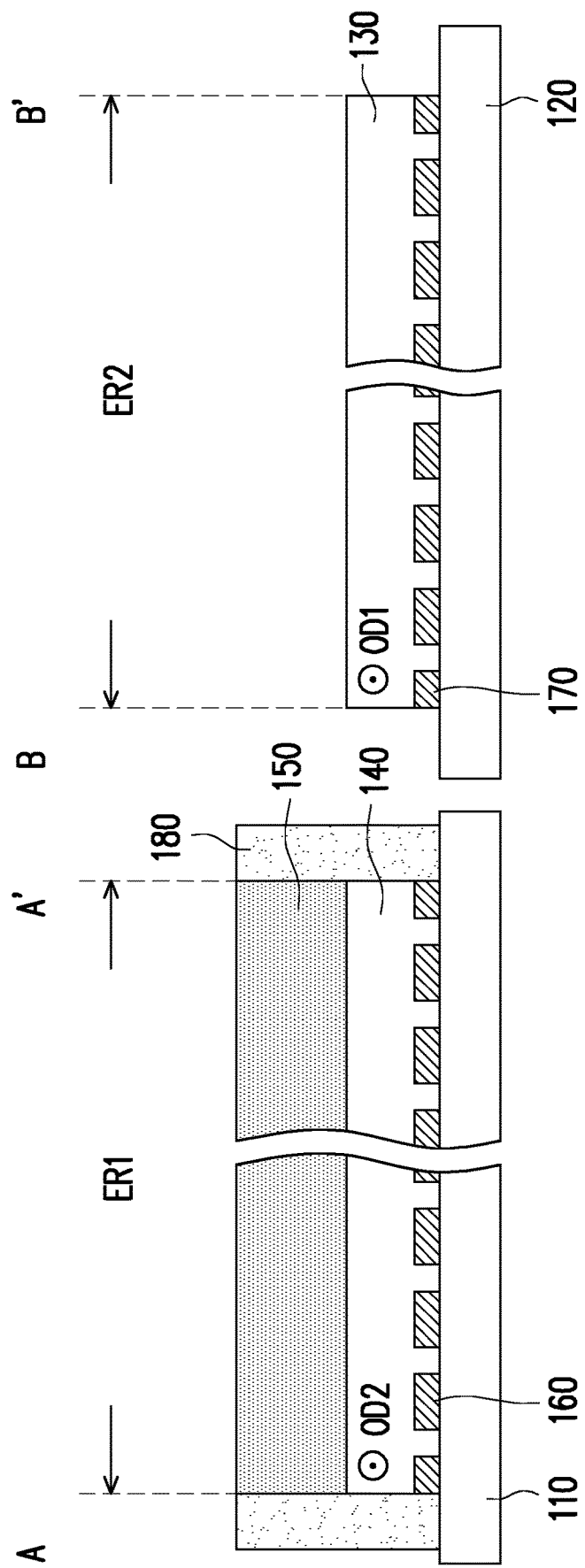

Referring to FIG. 2G and FIG. 3G, the liquid crystal material 150 is provided in a space surrounded by the spacer 180, and the liquid crystal material 150 is disposed between the spacer 180 and the lower alignment layer 140.

Figure 2H:
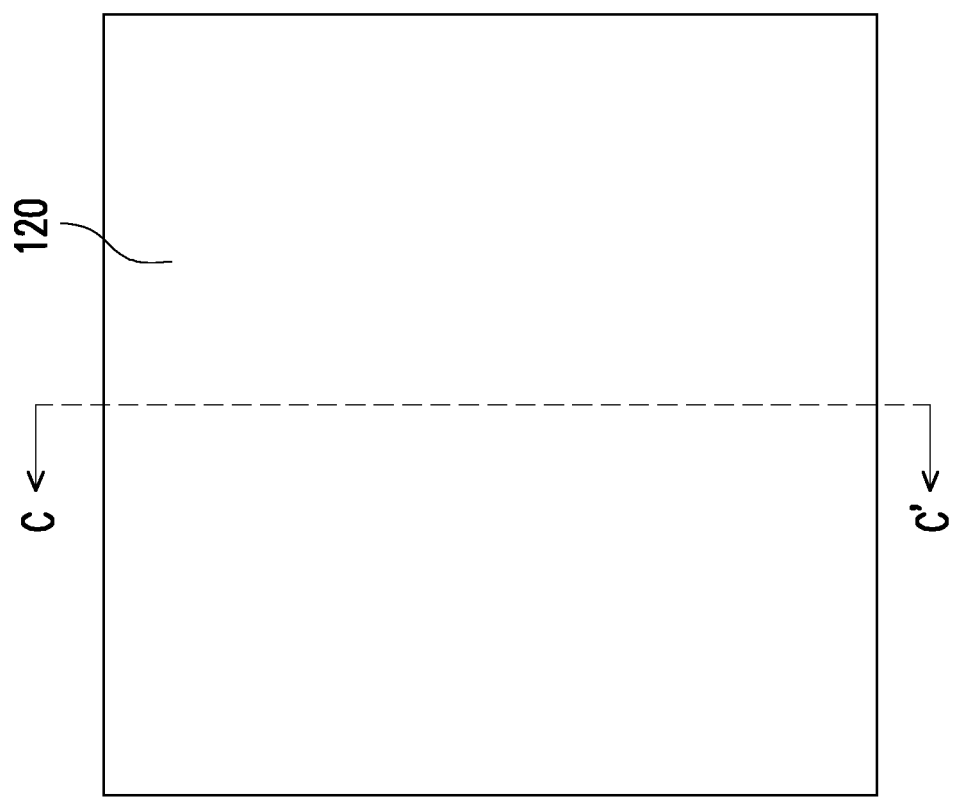
Figure 3H:
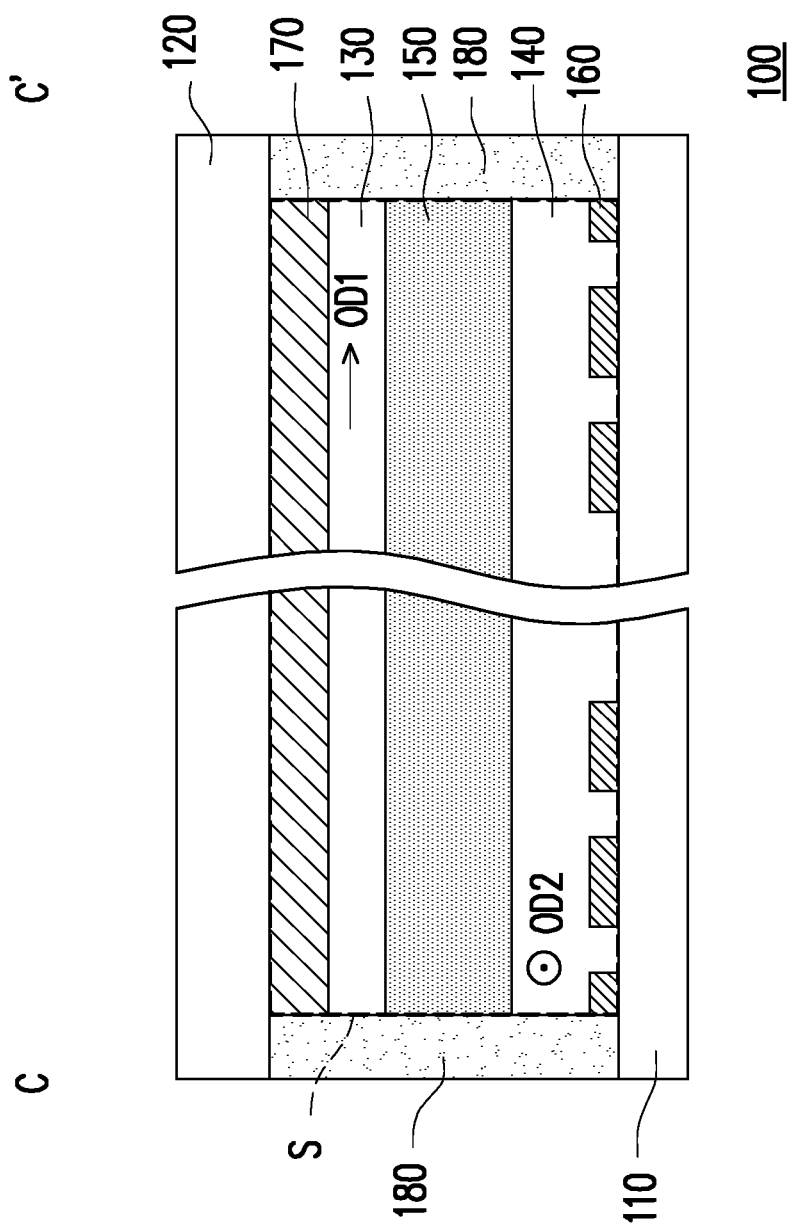

Referring to FIG. 2H and FIG. 3H, the quartz glass substrate 120 provided with the upper alignment layer 130 and the transparent conductive layer 160 is turned and disposed on the liquid crystal material 150 to seal the liquid crystal material 150 between the alignment layer 130 on the quartz glass substrate 110 and the lower alignment layer 140 on the quartz glass substrate 120, such that the orientation direction OD1 of the upper alignment layer 130 is perpendicular to the orientation direction OD2 of the lower alignment layer 140. Moreover, according to FIG. 3H, an orthogonal projection of the transparent conductive layer 170 on the quartz glass substrate 120 overlaps an orthogonal projection of the transparent conductive layer 160 on the quartz glass substrate 120. So far, the liquid crystal photoelectric apparatus 100 of the present embodiment is substantially manufactured.

The disposition manner of each element in the liquid crystal photoelectric apparatus 100 will be described in detail below.

Referring to FIG. 1A, in the liquid crystal photoelectric apparatus 100 of the present embodiment, the two quartz glass substrates 110 and 120 are disposed opposite to each other. The upper alignment layer 130 is disposed between the two quartz glass substrates 110 and 120. The lower alignment layer 140 is disposed between the upper alignment layer 130 and the quartz glass substrate 110. The spacer 180 is disposed on the two quartz glass substrates 110 and 120 to define an accommodation space S. The liquid crystal material 150 is disposed in the accommodation space S and is sandwiched between the upper and lower alignment layers 130 and 140. The transparent conductive layer 160 is disposed between the lower alignment layer 140 and the quartz glass substrate 110. The transparent conductive layer 170 is disposed between the upper alignment layer 130 and the quartz glass substrate 120. Specific patterns and disposition manner of the transparent conductive layers 160 and 170 may refer to the illustration of FIG. 2D and will be no longer described hereinafter. An extension direction of the finger portions 164 is perpendicular to an extension direction of the finger portions 174.

An optical effect of the liquid crystal photoelectric apparatus 100 of the present embodiment will be described in detail below.

Figure 5:
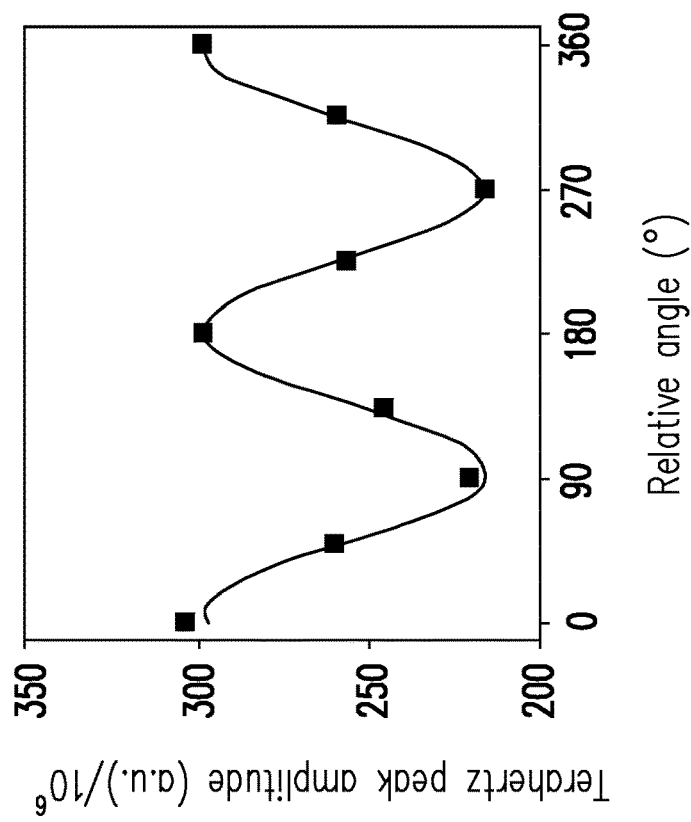
FIG. 5 is a graph showing a relationship between peak amplitudes and relative angles for the terahertz light beam.
Figure 4:
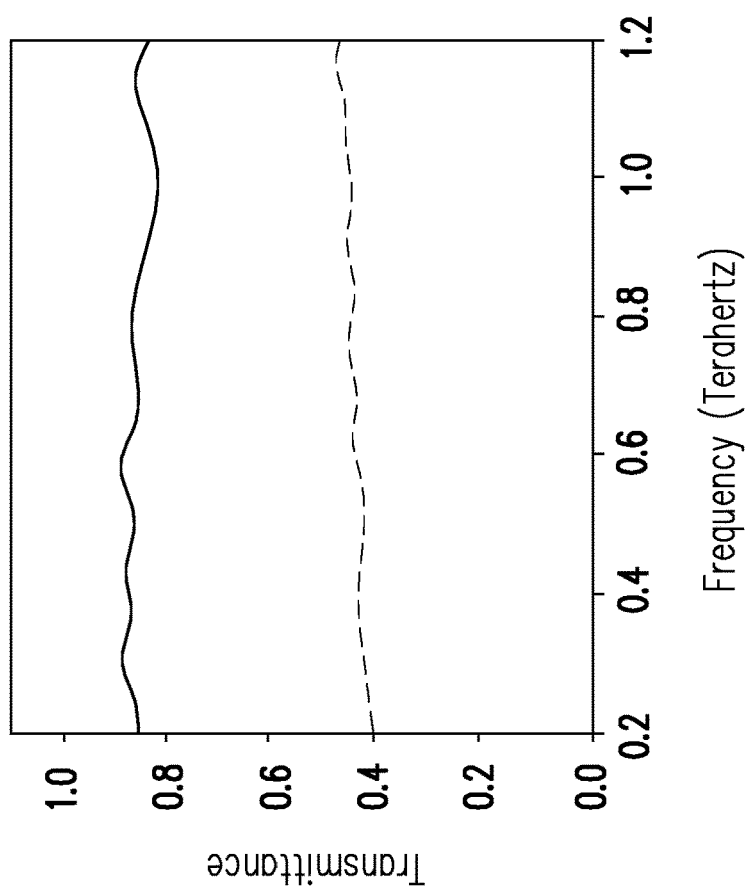
FIG. 4 is a graph showing a relationship between transmittance of a quartz glass substrate provided with a transparent conductive layer and a frequency of a corresponding incident terahertz light beam.

FIG. 4 is a graph showing a relationship between transmittance of a quartz glass substrate provided with a transparent conductive layer and a frequency of a corresponding incident terahertz light beam. FIG. 5 is a graph showing a relationship between peak amplitudes and relative angles for the terahertz light beam.

Referring to FIG. 4, the horizontal axis represents the frequency of the incident terahertz light beam, and the vertical axis represents the transmittance of the quartz glass substrate (110/120) provided with the transparent conductive layer (160/170). The solid line in FIG. 4 represents that a polarization direction of the incident terahertz light beam is parallel to the extension direction of the finger portions of the transparent conductive layer. Accordingly, if the polarization direction of the incident terahertz light beam is parallel to the extension direction of the finger portions, almost the incident terahertz light beam is capable of penetrating the transparent conductive layer and the corresponding quartz glass substrate, such that a high transmittance may be obtained. On the other hand, the dashed line in FIG. 4 represents that the polarization direction of the incident terahertz light beam is perpendicular to the extension direction of the finger portions of the transparent conductive layer. Accordingly, if the extension direction of the finger portions is perpendicular to the polarization direction of the incident terahertz light beam, a part of the incident terahertz light beam is blocked by the finger portions from penetrating the transparent conductive layer, such that the transmittance is dramatically reduced.

Referring to FIG. 5, the horizontal axis represents the relative angles between the extension direction of the finger portions and the polarization direction of the incident terahertz light beam, and the vertical axis represents the peak amplitudes of the incident terahertz light beam. The curve shown in FIG. 5 is a fitting curve of the peak amplitudes of the incident terahertz light beam which is measured according to different relative angles. According to FIG. 5, the incident terahertz light beam has high peak amplitudes in a condition that the relative angles are 0 degrees, 180 degrees, and 360 degrees and has lower peak amplitudes in a condition that the relative angles are 90 degrees and 270 degrees.

According to FIG. 4 and FIG. 5, for incident terahertz light beams with different polarization directions, the transparent conductive layer with the finger portions is capable of periodically modulating light intensity of the incident terahertz light beams, which may achieve an effect like an amplitude grating.

Figures 6, 7:
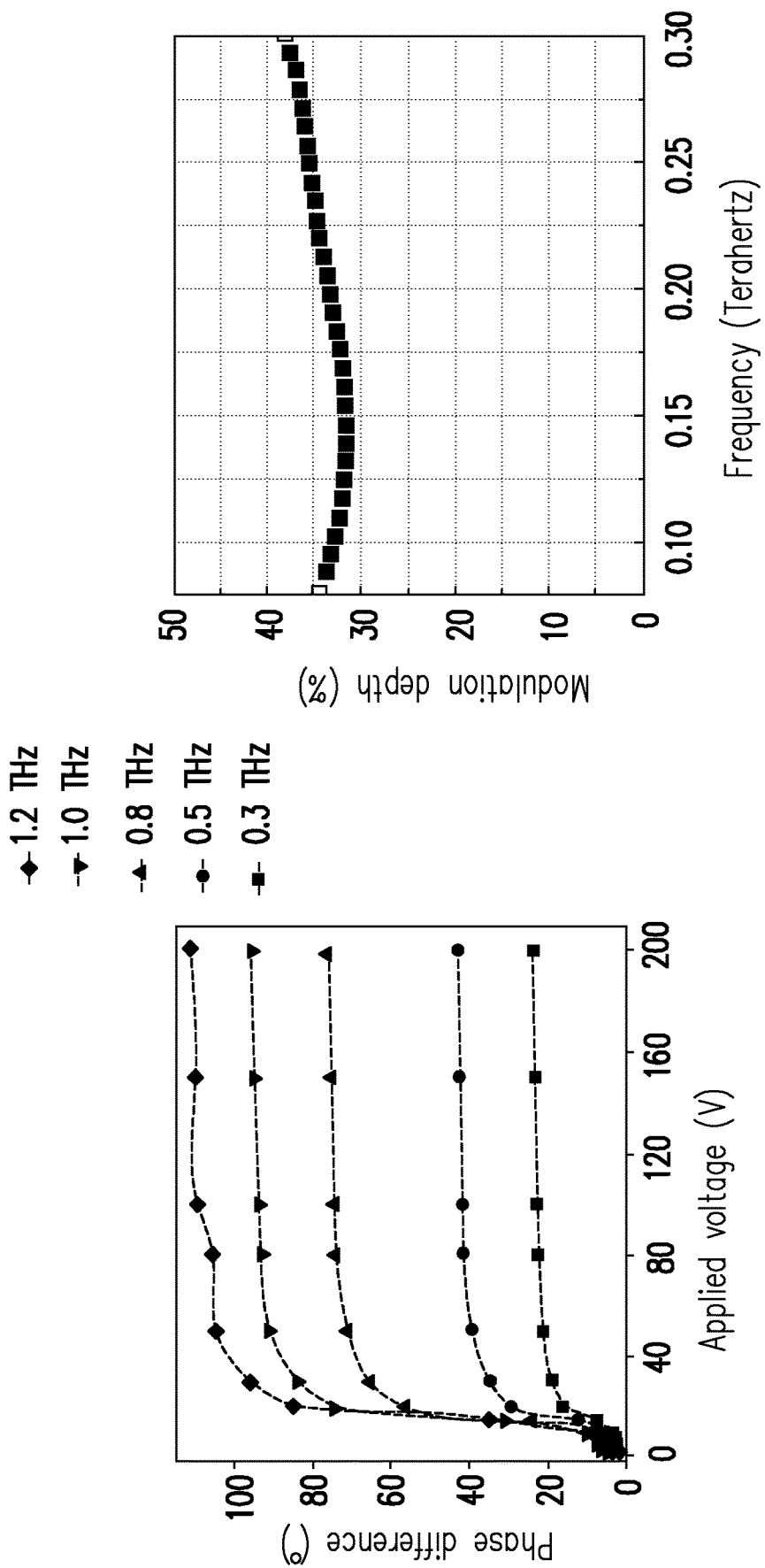
FIG. 6 is a graph showing a relationship between an applied voltage and a phase difference for the liquid crystal photoelectric apparatus of FIG. 1A and FIG. 1B in each pixel region.
FIG. 7 is a graph showing a relationship between an incident terahertz frequency and a corresponding modulation depth in each pixel region.

FIG. 6 is a graph showing a relationship between an applied voltage and a phase difference for the liquid crystal photoelectric apparatus of FIG. 1A and FIG. 1B in each pixel region. FIG. 7 is a graph showing a relationship between an incident terahertz frequency and a corresponding modulation depth in each pixel region.

Referring to FIG. 6, the horizontal axis represents levels of the applied voltage, and the vertical axis represents the phase difference between a light beam after passing through the liquid crystal photoelectric apparatus and a light beam before passing through the corresponding liquid crystal photoelectric apparatus. According to FIG. 6, the liquid crystal photoelectric apparatus 100 of the present embodiment may achieve producing a significant phase difference for the incident terahertz light beam at different frequencies.

Referring to FIG. 7, the horizontal axis represents the frequency of the incident terahertz light beam, and the vertical axis represents the amplitude modulation depth. According to FIG. 7, the liquid crystal photoelectric apparatus 100 of the present embodiment may allow an amplitude modulation depth of an incident terahertz wave having a frequency within a range from 0.1 terahertz to 0.3 terahertz to reach more than 30%. Accordingly, the liquid crystal photoelectric apparatus 100 of the present embodiment has preferable amplitude modulating capability.

In view of the foregoing, in the liquid crystal photoelectric apparatus 100 provided by the embodiments of the invention, since it uses inexpensive quartz glass for the material of the substrates, and by the pattern design of the transparent conductive layers 160 and 170 (i.e., the extension directions of both the finger portions 164 of the transparent conductive layer 160 and the finger portions 174 of the transparent conductive layer 170 is designed to be perpendicular to each other), so as to achieve the function of modulating the amplitude of the incident light. Therefore, the transparent conductive layers 160 and 170 are capable of modulating the amplitude and conducting electricity to generate an electric field. Moreover, the step of patterning the transparent conductive layers 160 and 170 is simple, and the use of the SRR having a complicated structure and manufacturing steps is avoided, such that the liquid crystal photoelectric apparatus 100 has low manufacturing cost. Next, the liquid crystal photoelectric apparatus 100 may modulate the phase difference of the incident light passing through the liquid crystal material 150 by applying the voltage to the transparent conductive layers 160 and 170, and as such, the liquid crystal photoelectric apparatus 100 may modulate the phase difference and the amplitude of the incident light. According to the above graphs, the liquid crystal photoelectric apparatus 100 of the present embodiment has preferable phase difference modulation capability and amplitude modulation capability at different frequencies of the incident terahertz light beam, which achieves a wide terahertz frequency application range.

Figure 8:
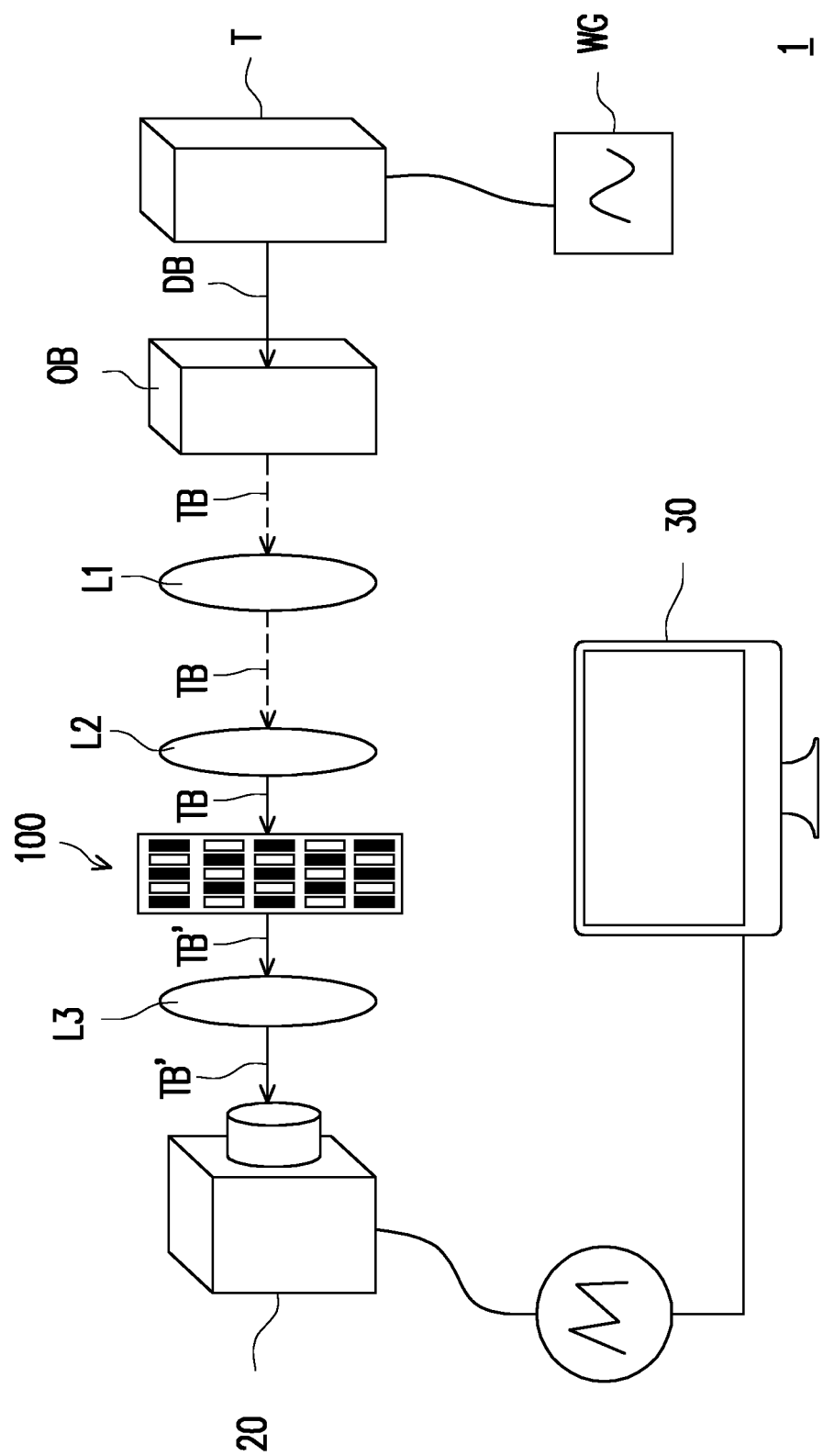
FIG. 8 is a schematic view of an optical imaging processing system according to an embodiment of the invention.

FIG. 8 is a schematic view of an optical imaging processing system according to an embodiment of the invention.

Referring to FIG. 8, the above-described liquid crystal photoelectric apparatus 100 may be applied to an optical imaging processing system 1. The optical imaging processing system 1 is adapted to analyze image information of an object to be tested OB. The optical imaging processing system 1 includes a terahertz light emitter 10, the above-described liquid crystal photoelectric apparatus 100, an optical receiver 20 and an image processor 30. The elements in the optical imaging processing system 1 and the disposition relationship between the elements will be described in detail below.

The terahertz light emitter 10 is used to emit a detection beam DB having a frequency in a terahertz band. In an embodiment, a wave pattern generator WG, an emitter E and a polarizer (not shown) are disposed in the terahertz light emitter 10. The wave generator WG is used to set a waveform of the detection beam DB, and the transmitter E is used to emit the detection beam DB. The polarizer allows the emitted detection beam DB to have a specific polarization direction.

Each of the elements in the liquid crystal photoelectric apparatus 100 and the corresponding effects have been described as the above and will be no longer described. The pixel regions PR are schematically illustrated as black and white array elements in the liquid crystal photoelectric apparatus 100 in FIG. 8.

The optical receiver 20 generally refers to an element capable of converting an optical signal into an electrical signal, which may be, for example, a Golay cell, but the invention is not limited thereto.

The image processor 30 is used to receive an electrical signal from the optical receiver 20 and perform image related processing based on the electrical signal. In the present embodiment, the image processor 30 is, for example, a computer.

In addition, one or more lenses L1 to L3 may be selectively additionally disposed in the optical imaging processing system 1 of the present embodiment to adjust a light beam path.

The disposition relationship between the above elements and the object to be tested will be described in detail below. In FIG. 8, the object to be tested OB is disposed between the terahertz light emitter 10 and the liquid crystal photoelectric apparatus 100. The lenses L1 and L2 are disposed between the object to be tested OB and the terahertz light emitter 10. The lens L3 is disposed between the liquid crystal photoelectric apparatus 100 and the optical receiver 20. After being emitted from the terahertz light emitter 10, the detection beam DB passes through the object to be tested OB to obtain a transmission beam TB. The transmission beam TB carries the image information of the object to be tested OB. The transmission beam TB sequentially passing through the lenses L1 and L2 enters the liquid crystal photoelectric apparatus 100 and is modulated by the liquid crystal photoelectric apparatus 100. Referring further to FIG. 1A, the transmission beam TB sequentially passing through the quartz glass substrate 120, the transparent conductive layer 170, the upper alignment layer 130, the liquid crystal material 150, the lower alignment layer 140, the transparent conductive layer 160 and the quartz glass substrate 120 is emitted from the liquid crystal photoelectric apparatus 100. A transmission beam TB' obtained after the modulation by the liquid crystal photoelectric apparatus 100 passes through the lens L3 and is transmitted to the optical receiver 20. The optical receiver 20 converts the modulated transmission beam TB' into an electrical signal and transmits the electrical signal to the image processor 30 at the back end for the image related processing.

As described above, the optical imaging processing system 1 of the embodiment of the invention uses the above-described liquid crystal photoelectric apparatus 100. Since the liquid crystal photoelectric apparatus 100 uses the transparent conductive layers 160 and 170 which are easily patterned, the number of the pixel regions PR may be increased easily, and thus, the optical imaging processing system 1 may have preferable image resolution, as well as have lower manufacturing cost and a wider terahertz frequency application range.

It should be noted that in addition to the optical imaging processing system 1 as described above, the liquid crystal photoelectric apparatus 100 of the embodiment of the invention may also be widely applied to various fields. For example, it may be applied to the communication field, the biomedical diagnostics field, the security inspection field, the military detection field, or the non-intrusive inspection field, and the invention is not limited by the field in which the liquid crystal photoelectric apparatus 100 is applied.

Based on the above, in the liquid crystal photoelectric apparatus provided by the embodiments of the invention, since the substrates for supporting each element are inexpensive quartz glass substrates and can achieve the function of modulating an amplitude of the incident light with the design of the transparent conductive layers which are easily patterned and the extension directions of the finger portions, the manufacturing cost can be lower. Next, the liquid crystal photoelectric apparatus can modulate the phase difference of the incident light by applying the voltage to the transparent conductive layers. Therefore, the liquid crystal photoelectric apparatus of the embodiment of the invention can have the capability of modulating the phase difference and the amplitude simultaneously and exhibits preferable phase difference modulation capability and amplitude modulation capability at different frequencies of the incident terahertz light beam, so as to have the wider application range of the frequencies of the terahertz light beam. In the optical imaging processing system provided by the embodiments of the invention, the liquid crystal photoelectric apparatus is used as a spatial light modulator, and since the liquid crystal photoelectric apparatus uses the transparent conductive layers which are capable of being easily patterned, the number of the pixel regions can be easily increased, such that the optical imaging processing system can have a preferable image resolution as well as the advantages of the liquid crystal photoelectric processing apparatus.

Although the invention has been disclosed in the above embodiments, it is not intended to limit the invention, and those skilled in the art can make some modifications and refinements without departing from the spirit and scope of the invention. The scope of the invention is defined by the scope of the appended claims.

What is claimed is:

1. A liquid crystal photoelectric apparatus, comprising:
a first quartz glass substrate;
a second quartz glass substrate;
an upper alignment layer, disposed between the first quartz glass substrate and the second quartz glass substrate;
a lower alignment layer, disposed between the upper alignment layer and the second quartz glass substrate, wherein a first orientation direction of the upper alignment layer is perpendicular to a second orientation direction of the lower alignment layer;
a liquid crystal material, disposed between the upper alignment layer and the lower alignment layer;
a first transparent conductive layer, disposed between the upper alignment layer and the first quartz glass substrate and comprising at least one first main portion and a plurality of first finger portions extending from the corresponding first main portion; and
a second transparent conductive layer, disposed between the lower alignment layer and the second quartz glass substrate and comprising a second main portion and a plurality of second fingers extending from the second main portion,
wherein an extension direction of the first finger portions is perpendicular to an extension direction of the second finger portions.

2. The liquid crystal photoelectric apparatus as recited in claim 1, an orthogonal projection of the first transparent conductive layer on the second quartz glass substrate overlaps with an orthogonal projection of the second transparent conductive layer on the second quartz glass substrate.

3. The liquid crystal photoelectric apparatus as recited in claim 1, wherein the liquid crystal photoelectric apparatus has a plurality of pixel regions arranged in an array manner, the at least one first main portion is a plurality of first main portions, and each of the pixel regions is provided with the first main portion and the first finger portions extending from the corresponding first main portion.

4. The liquid crystal photoelectric apparatus as recited in claim 1, further comprising a spacer disposed between the first quartz glass substrate and the second quartz glass substrate to define an accommodation space, wherein the liquid crystal material is disposed in the accommodation space.

5. The liquid crystal photoelectric apparatus as recited in claim 1, wherein the liquid crystal photoelectric apparatus is a liquid crystal light modulator.

6. An optical imaging processing system, comprising:
a terahertz light emitter, used to emit a detection beam having a frequency in a terahertz band, the detection beam passing through an object to be tested to obtain a transmission beam, and the transmission beam having an image information of the object to be tested;
a liquid crystal photoelectric apparatus disposed on a transmission path of the transmission beam and comprising:
a first quartz glass substrate;
a second quartz glass substrate;
an upper alignment layer, disposed between the first quartz glass substrate and the second quartz glass substrate;
a lower alignment layer, disposed between the upper alignment layer and the second quartz glass substrate;
a liquid crystal material, disposed between the upper alignment layer and the lower alignment layer;
a first transparent conductive layer, disposed between the upper alignment layer and the first quartz glass substrate and comprising at least one first main portion and a plurality of first finger portions extending from the corresponding first main portion; and
a second transparent conductive layer, disposed between the lower alignment layer and the second quartz glass substrate and comprising a second main portion and a plurality of second fingers extending from the second main portion, wherein an extension direction of the first finger portions is perpendicular to an extension direction of the second finger portions;

an optical receiver, disposed on the transmission path of the transmission beam, and the liquid crystal photoelectric apparatus being disposed between the object to be tested and the optical receiver; and an image processor, coupled to the optical receiver and analyzing the image information of the object to be tested according to the transmission beam.

7. The optical imaging processing system as recited in claim 6, wherein an orthogonal projection of the first transparent conductive layer on the second quartz glass substrate overlaps an orthogonal projection of the second transparent conductive layer on the second quartz glass substrate.

8. The optical imaging processing system as recited in claim 6, wherein the liquid crystal photoelectric apparatus has a plurality of pixel regions arranged in an array, the at least one first main portion is a plurality of first main portions, and one of the first main portions and the first finger portions extending from the corresponding first main portion are disposed in each of the pixel regions.

9. The optical imaging processing system as recited in claim 6, wherein a first orientation direction of the upper alignment layer is perpendicular to a second orientation direction of the lower alignment layer.

10. The optical imaging processing system as recited in claim 6, wherein the liquid crystal photoelectric apparatus further comprises a spacer disposed between the first quartz glass substrate and the second quartz glass substrate to define an accommodation space, and the liquid crystal material is disposed in the accommodation space.

* * * * *